(12) United States Patent
Deiss et al.

(10) Patent No.: US 7,830,968 B1
(45) Date of Patent: Nov. 9, 2010

(54) APPARATUS FOR PROVIDING A VIDEO LIP SYNC DELAY AND METHOD THEREFORE

(75) Inventors: Michael Scott Deiss, Zionsville, IN (US); Mark Robert Anderson, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/582,451

(22) PCT Filed: Jan. 7, 1999

(86) PCT No.: PCT/US99/00315

§ 371 (c)(1), (2), (4) Date: Nov. 10, 2000

(87) PCT Pub. No.: WO99/35824

PCT Pub. Date: Jul. 15, 1999

(51) Int. Cl.
H04B 1/66 (2006.01)

(52) U.S. Cl. ............................ 375/240.28; 375/240.25; 382/233; 382/235; 348/725; 348/728; 348/729; 348/731; 725/70; 725/68; 725/110; 725/120; 725/151

(58) Field of Classification Search ............ 375/240.28, 375/240.25, 240, 240.26; 725/151, 152–153, 725/37, 131–134, 139–142, 63–70, 87, 110, 725/120; 348/446, 555, 554, 423, 425, 426, 348/387.1, 725, 728, 729, 731; 382/233, 382/235

See application file for complete search history.

(56) References Cited

U.S. PATENT DOCUMENTS

| | | | |
|---|---|---|---|
| 4,626,892 A | | 12/1986 | Nortrup et al. |
| 5,387,943 A | * | 2/1995 | Silver .......................... 348/512 |
| 5,602,595 A | * | 2/1997 | Citta et al. ................... 348/495 |
| 5,703,877 A | * | 12/1997 | Nuber et al. ........... 375/240.03 |
| 5,818,539 A | * | 10/1998 | Naimpally et al. ..... 375/240.26 |
| 5,844,623 A | * | 12/1998 | Iwamura ..................... 348/555 |
| 5,898,695 A | * | 4/1999 | Fujii et al. ................... 370/464 |
| 5,926,228 A | * | 7/1999 | Jeon et al. ................... 348/554 |
| 5,963,261 A | * | 10/1999 | Dean .......................... 348/446 |
| 6,061,096 A | * | 5/2000 | Limberg ..................... 348/555 |
| 6,130,898 A | * | 10/2000 | Kostreski et al. .............. 725/87 |
| 6,134,419 A | * | 10/2000 | Williams ..................... 725/151 |
| 6,310,654 B1 | * | 10/2001 | Oku et al. ................... 348/554 |

FOREIGN PATENT DOCUMENTS

| | | |
|---|---|---|
| EP | 598295 | 5/1994 |
| EP | 766462 | 4/1997 |
| EP | 776134 | 5/1997 |
| JP | 60-212064 | 10/1985 |
| JP | 07-274085 | 10/1995 |
| JP | 08-168044 | 6/1996 |
| JP | 09-130697 | 5/1997 |
| JP | 09-172608 | 6/1997 |

OTHER PUBLICATIONS

European Search Report dated Apr. 28, 1999.

* cited by examiner

*Primary Examiner*—Shawn An
(74) *Attorney, Agent, or Firm*—Robert D. Shedd; Joseph J. Opalach; Reitseng Lin

(57) ABSTRACT

A digital receiver for processing one of a packetized input data stream and a digitized standard definition input signal is provides a delay in the processing of the standard definition audio input signal to maintain synchronism with the processing of a corresponding standard definition video signal.

20 Claims, 2 Drawing Sheets

APPARATUS FOR PROVIDING A VIDEO LIP SYNC DELAY AND METHOD THEREFORE

FIELD OF THE INVENTION

The invention concerns an apparatus for providing a delay of a standard definition television ("SDTV") (e.g., NTSC, PAL or SECAM) audio signal to maintain proper synchronization of the video image and the audio output. The invention is especially well suited for use in a high definition television ("HDTV") system.

BACKGROUND OF THE INVENTION

Typical consumer electronic products, such as televisions and VCRs are known to be configured to receive standard definition signals (such as NTSC, PAL or SECAM). However, it is recognized that the emerging digital consumer electronic products must be configured to receive both digital streams and standard definition signals. Digital receivers are designed to receive television information in the form of a stream of digital packets representing video and audio information in compressed form in accordance with a predetermined digital compression standard. For example, the MPEG video and audio compression standards may be employed. The MPEG video and audio compression standards are international standards for the coded representation of and audio information developed by the Motion Pictures Expert Group.

SUMMARY OF THE INVENTION

The present invention resides in part in the recognition that a high definition digital receiver (e.g., HDTV) configured to receive SDTV signals is subject to displaying a video image that is not in synchronization with the audible output and in part with the apparatus to maintain synchronization.

In accordance with one aspect of the present invention, a receiver apparatus comprises means for receiving a packetized input data stream; means for receiving a digitized audio signal and a digitized video signal; and means for partitioning said packetized data stream to generate a video component and an audio component. Further, the apparatus comprises a first and second means for digital signal processing to generate, respectively, a decompressed video output signal in response to one of said video component of said packetized data stream and said digitized video signal and a decompressed audio output signal in response to one of said audio component of said packetized data stream and said digitized audio signal. Still further, the apparatus comprises a means for transposing said video output signal to a displayable video signal and said audio output signal to an audible output signal.

In accordance with another aspect of the present invention, the receiver apparatus further comprises an adjustable means for delaying said output audio signal to be in synchronism with said displayable video signal.

In accordance with yet another aspect of the present invention, the adjustable delaying means comprises an adjustable memory device and may be connected to one of the second processing means or the partitioning means. The second processing means further comprises means for secondary audio processing, such as surround sound processing.

In accordance with a method aspect of the present invention, there is provided a method for processing an input signal comprising; receiving one of a packetized input data stream and a digitized signal comprised of a digitized video signal and a digitized audio signal; partitioning one of said packetized data stream to generate a video component and an audio component; converting said digitized video signal into a progressive scan format; processing one of said packetized data stream and said digitized input signal to generate a decompressed video and audio output signal; and transposing said video output signal to a displayable video signal and said audio output signal to an audible output signal.

In accordance with another method aspect of the present invention, the method for processing an input signal further comprises delaying said audio output signal to be in synchronism with said displayable video signal. The step of delaying comprises providing said audio output signal to an adjustable memory device or to a secondary processor.

These and other aspects of the invention will be described with respect to the accompanying Drawings.

DETAILED DESCRIPTION OF THE DRAWING

Digital receiver 15 tunes, demodulates and otherwise processes the received television signal as will be described in detail below to produce displayable video images on a conventional display device and audible signals on conventional speakers in response to received television information.

Figure 1:
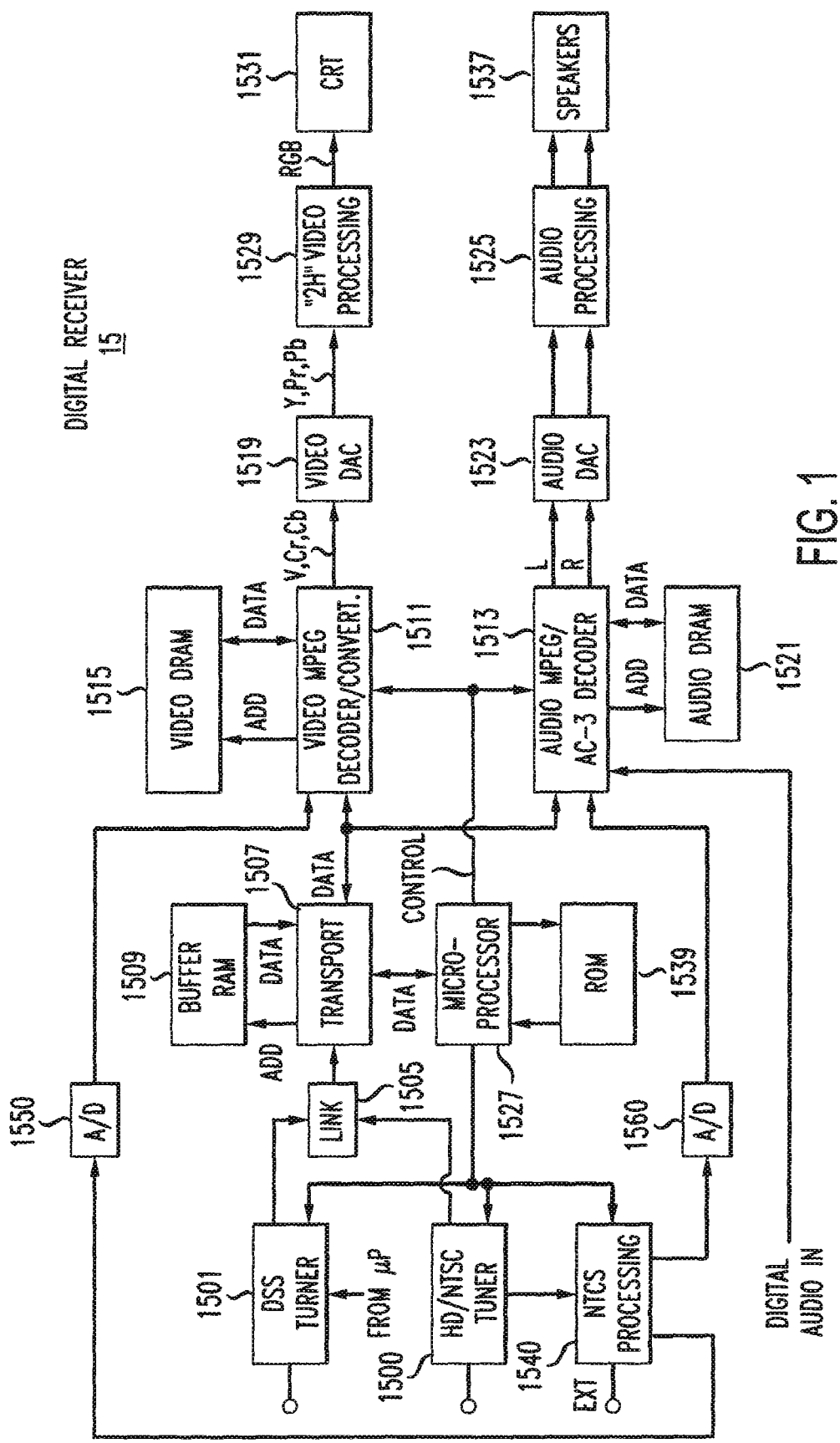
FIG. 1 is a simplified schematic block diagram of a digital receiver including apparatus constructed in accordance with an exemplary embodiment of the present invention.

The apparatus shown in FIG. 1 is a digital receiver 15, such as, for example, one that may be employed in a high definition television ("HDTV"). Particularly, the television information is received in either (1) compressed form in accordance with a predetermined digital compression standard (for example, the MPEG video and audio compression standards) or (2) SDTV analog signal (for example, NTSC, PAL or SECAM). The MPEG video and audio compression standards are international standards for the coded representation of and audio information developed by the Motion Pictures Expert Group.

The digital video and audio signals are compressed and encoded according to the MPEG video and audio compression and encoding standards to form respective series or streams of data packets. The video and audio packets are multiplexed to form a stream of packets for transmission. Each packet of the transmission stream includes a data or "payload" portion and a header portion which identifies the type of information represented by the payload portion of the packet. Packets corresponding to control and other data may also be added the transmission stream.

Forward error correction (FEC) data is added to the packets in order make the correction of errors due to noise within the transmission path possible. The well known Viterbi and Reed-Solomon types of forward error correction coding may both be advantageously employed. The digital information resulting from the compression, encoding and error correction operations is modulated on a carrier in what is known in the digital transmission field as QPSK (Quadrature Phase Shift Keying) modulation.

Digital receiver 15 includes both a HD/NTSC tuner 1500 and a DSS tuner 1501, both having a local oscillator and mixer (not shown) for selecting the appropriate carrier signal form the plurality of received signals and for converting the frequency of the selected carrier to a lower frequency to produce an intermediate frequency (IF) signal. Further HD/NTSC tuner 1500 and DSS tuner 1501 demodulate the IF signal.

DSS tuner 1501 may include a QPSK demodulator, not shown, to produce a demodulated digital signal and a FEC decoder, not shown, to decode the error correction data contained in the demodulated digital signal, and based on the error correction data corrects the demodulated packets representing video, audio and other information to produce a stream of error corrected data packets which are provided to link circuitry 1505. The SDTV demodulated signal from HD/NTSC tuner 1500 is further processed in a conventional manner by NTSC processing circuitry 1540. (The details of NTSC processing circuitry 1540 are not required to fully understand the present invention.) Whereas, the HD demodulated stream is provided the link circuitry 1505.

A MPEG transport decoder unit 1507 cooperates with a buffer memory in the form of a random access memory (RAM) 1509 to route the payload portion of the video packets of the error corrected stream to a video MPEG decoder 1511 and the payload portion of the audio packets to an audio MPEG/AC-3 decoder 1513 via a data bus or separate lines according to the header information contained in the packets. RAM 1509 is used to temporarily store packets of the data stream of the transmitted signal in respective memory locations in accordance with the type of information which they represent. Transport unit 1507 is a memory manager for buffer RAM 1509 which demultiplexes the data packets of the error corrected stream and routes the payload portions of the packets to respective memory locations according to the header portions of the respective packets. The contents of the video and audio sections of RAM 1509 are read out and transferred to video MPEG decoder 1511 and audio MPEG/AC-3 decoder 1513, respectively, on demand in response to requests from these units. Details of the construction of transport 1507 and buffer RAM 1509 are not required to understand the present invention, but may be found in U.S. patent application Ser. No. 232,789, entitled "A Packet. Video Signal Inverse Transport System" filed for M. S. Deiss on Apr. 22, 1994.

Video MPEG decoder 1511 interfaces with a dynamic random access memory (DRAM) 1515 to decode and decompress the payload portion of the video packets to form a stream or sequence of digital words representing video information in component form. For example, the components may correspond to a luminance (Y) component and two color difference (Cr and Cb) components. Further, video MPEG decoder 1511 has a separate input to receive a digitized SDTV video signal from analog-to-digital converter ("A/D") 1550. (Details of the construction of video MPEG decoder is not required to understand the present invention.) Video decoding and decompression integrated circuits (ICs) are commercially available. For example, a MPEG decoding and decompression IC, identified by part number ST3240, is available from SGS Thomson, of France.

The luminance and chrominance representative digital words are converted to analog luminance and chrominance signals by respective sections of a digital-to-analog converter (DAC) 1519.

These analog luminance and chrominance signals are coupled to "2H" video processing circuitry 1529 which converts the component representative digital words to three separate video signals; R, G and B. These video signals are provided to a display device 1531. (Details of the construction of the well known "2H" video processing circuitry and display device are not required to understand the present invention.)

Audio MPEG/AC-3 decoder 1513 interfaces with dynamic random access memory (DRAM) 1521 to decode and decompress the payload portion of the audio packets to produce a sequences of digital words representing "left" (L) and "right" (R) audio information. As is well known in the art, memory 1521 may optionally be integral with audio MPEG/AC-3 decoder 1513. Further, decoder 1513 has a separate input to receive a digitized standard definition audio signal (explained in detail below in connection with FIG. 2a). Audio decoding and decompression ICs are commercially available. For example, a MPEG audio decoding and decompression IC, identified by part number DSP56011, is available from Motorola. The sequences of audio representative digital words are converted to baseband analog left and right audio signals by respective sections of DAC 1523 and audio processing circuitry 1525. Although only two audio channels are shown in the Figure, it will be appreciated that in practice, one or more additional audio channels, for example, for "surround sound" reproduction, may be provided.

The baseband analog video and audio signals are coupled to speakers 1537, which may be integral with display device 1531 via respective baseband connections. The baseband analog video and audio signals may also be coupled to a modulator (not shown) which modulates the analog signals on to a radio frequency (RF) carrier in accordance with a conventional television standard such as NTSC, PAL or SECAM for coupling to the antenna input of a display device without baseband inputs.

A microprocessor 1527 provides a frequency selection control data to HD/NTSC tuner 1500 and DSS tuner 1501 for controlling the operation of the tuner to tune channels selected by the user. Microprocessor 1527 also operates interactively with transport 1507 to affect the routing of payload portions of packets. Microprocessor 1527 additionally provides control data to video MPEG decoder 1511 and audio decoder 1513 via a control bus. Microprocessor 1527 operates in response to a control program stored in a "read only" memory (ROM) 1539.

Both video MPEG decoder 1515 and audio MPEG/AC-3 decoder 1513 are configured to receive the digitized video and audio components, respectively, of a SDTV analog input signal. Digitized video and audio components are provided by passing the demodulated and processed analog video and audio components generated by NTSC processing circuitry through analog-to-digital converters 1550 and 1560, respectively. In operation, the digitized video component is processed by the video MPEG decoder and up-converter 1511 and the digitized audio component is processed by audio MPEG/AC-3 decoder 1513. The time to process the digitized video component is greater than the time necessary to process the digitized audio component thereby creating a delay between audio output and the display image.

Figure 2:
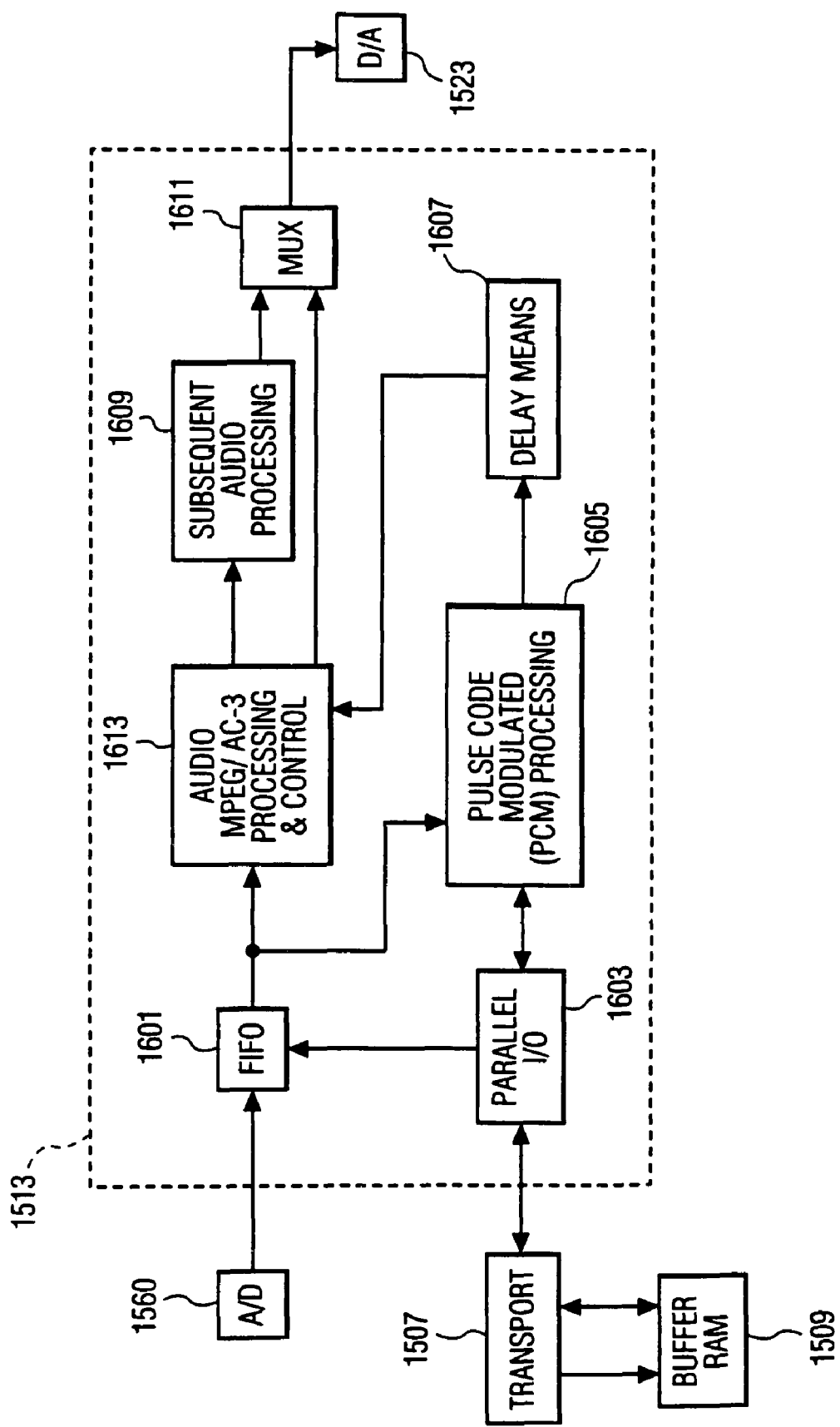
FIG. 2 is a simplified schematic block diagram of the audio MPEG/AC-3 decoder of FIG. 1.

The apparatus shown in FIG. 2 is a simplified schematic block diagram of the audio MPEG/AC-3 decoder 1513 discussed above. As described above, decoder 1513 generates digital words which represent the audio information in response to either a digitized SDTV audio signal produced by A/D 1560 or the audio portion of the input stream produced by MPEG transport decoder unit 1507 and RAM 1509. The details of audio MPEG/AC-3 decoder 1513 will be discussed in terms of it functional operation and signal flow path. The audio portion of the input MPEG stream is supplied to decoder 1513 through parallel input/output 1603. The input stream is provided to FIFO memory means 1601 for initial processing and formatting. Audio MPEG/AC-3 Processing circuitry 1613 processes the input stream to produce sequences of digital words representing the audio information. Additional audio processing, such as surround sound processing, may be performed by subsequent audio processing means 1609 to produce further processed audio information. A control signal (not shown) is provided multiplexer ("MUX") 1611 to select between the audio information generated by processing and control circuitry 1613 and the further processed audio information generated by subsequent audio processing means 1609.

Audio MPEG/AC-3 decoder 1513 is configured to generate audio information in response to a digitized SDTV audio input signal received from A/D 1560 as described above. FIFO memory means 1601 formats the digitized audio input signal prior to it being provided to pulse code modulated circuitry 1605. As discussed above, the time to process the digitized SDTV audio input signal is less than the time necessary to process the corresponding digitized video signal thereby necessitating the insertion of a delay in the audio processing to maintain synchronization between these two signals. The PCM processed audio input signal is provided to delay means 1607. Delay means 1607 may be a portion of the general memory 1521 associated with the audio MPEG/AC-3 decoder 1513. The delayed audio input signal is provided to the control portion of audio MPEG/AC-3 processing circuitry 1613 and may either be supplied directly to MUX 1611 or to subsequent audio processing means 1609 as described above prior to being supplied to D/A 1523.

Alternately, the PCM processed audio signal may be provided to transport unit 1507 and RAM 1509 through parallel I/O 1603 for delay processing. Specifically, RAM 1509 will be used to achieve the delay accomplished by delay means 1607 as described above.

While the present invention has been described in terms of a specific embodiment, it will be appreciated that modifications may be made. These and other modifications are contemplated to be within the scope of the invention defined by the following claims.

The invention claimed is:

1. A receiver comprising:
   (a) a first input for receiving a packetized input data stream comprised of multiplexed and compressed packets, each of said packets having at least header and payload data;
   (b) a second input for receiving an analog signal;
   (c) a decoder unit partitioning said packetized data stream to generate a video component and an audio component;
   (d) a processor processing said analog signal to generate a digitized audio signal and a digitized video signal;
   (e) first digital signal processing arrangement decompressing said video component of said packetized data stream, and digital signal processing said decomposed video component and said digitized video signal to generate a video output signal;
   (f) second digital signal processing arrangement decompressing said audio component of said packetized data stream, and digital signal processing said decompressed audio component and said digitized audio signal to generate an audio output signal;
   (g) a delay selectively delaying the audio output signal for the digitized audio signal to synchronize an audible audio signal with a displayable video signal; and
   (h) a converting arrangement transposing said video output signal to the displayable video signal and said audio output signal to the audible output signal.

2. The receiver of claim 1 wherein said delay comprises an adjustable memory device.

3. The receiver of claim 2 wherein said delay is connected to said second digital signal processing arrangement.

4. The receiver of claim 1 wherein said delay includes said partitioning decoder unit.

5. The receiver of claim 1 wherein said second digital signal processing arrangement further comprises a processing element digital signal processing the digitized audio signal and the decompressed audio component.

6. The receiver of claim 5 wherein said processing element in said second digital signal processing arrangement comprises a surround sound processor.

7. The receiver of claim 1 wherein said first digital signal processing arrangement comprises a converter converting said digitized video signal having an interlace video format into a digitized video signal having a progressive scan format.

8. The receiver of claim 1, wherein the delay is disposed such that the delaying occurs before the digital signal processing of the digitized audio signal has been completed.

9. The receiver of claim 8, wherein the delaying occurs before the digital signal processing of the digitized audio signal.

10. The receiver of claim 1, wherein the delay is disposed such that the delaying occurs after the digital signal processing of the digitized audio signal.

11. The receiver of claim 1, wherein the first digital signal processing arrangement comprises a converting element for digital signal processing the digitized video signal and the decompressed video component.

12. A method for processing input signals having video and audio components, said method comprising:
   receiving a packetized input data stream comprised of multiplexed and compressed packets, each of said packets having at least header and payload data;
   receiving an analog signal;
   partitioning said packetized data stream to generate a video component and an audio component;
   processing said analog signal to generate a digitized video signal and a digitized audio signal;
   decompressing said video component of said packetized data stream to generate a decompressed video signal, and digital signal processing said decompressed video signal and said digitized video signal to generate a video output signal;
   decompressing said audio component of said packetized data stream to generate a decompressed audio signal, and digital signal processing said decompressed audio signal and said digitized audio signal to generate an audio output signal;
   delaying the audio output signal for the digitized audio signal to synchronize an audible audio signal with a displayable video signal; and
   transposing said video output signal to the displayable video signal and said audio output signal to the audible output signal.

13. The method of claim 12 wherein the step of delaying is performed before the step of digital signal processing said digitized audio signal has been completed.

14. The method of claim 13 wherein the step of delaying is performed before the step of digital signal processing said digitized audio signal.

15. The method of claim 12 further comprising converting said digitized video signal into a progressive scan format.

16. The method of claim 12 wherein the step of delaying is performed after the step of digital signal processing said digitized audio signal.

17. A receiver comprising:
   a tuner receiving a packetized input data stream comprised of multiplexed and compressed packets, each of said packets having at least header and payload data;
   an input for receiving an analog signal;
   a processor processing said analog signal to generate a digitized audio signal and a digitized video signal;

a transport decoder unit partitioning said packetized data stream to generate a video component and an audio component;

a first digital signal arrangement decompressing said video component to generate decompressed video signal, wherein said first digital signal processing arrangement applies a first digital signal processing function to said decompressed video signal and said digitized video signal to produce a video output signal;

a second digital signal arrangement decompressing said audio component to generate decompressed audio signal, wherein said second digital signal processing arrangement applies a second digital signal processing function to said decompressed audio signal and said digitized audio signal to generate an audio output signal;

a delay selectively delaying the audio output signal for the digitized audio signal to synchronize an audible audio signal with a displayable video signal; and a converting arrangement transposing said video output signal to the displayable video signal and said audio output signal to the audible output signal.

18. The receiver of claim 17, wherein the delay is disposed such that the delaying occurs before the digital signal processing of the digitized audio signal has been completed.

19. The receiver of claim 18, wherein the delaying occurs before the digital signal processing of the digitized audio signal.

20. The receiver of claim 17, wherein the delay is disposed such that the delaying occurs after the digital signal processing of the digitized audio signal.

* * * * *